(12) United States Patent
He

(10) Patent No.: US 8,740,273 B2
(45) Date of Patent: Jun. 3, 2014

(54) CLAMPING MECHANISM

(71) Applicants: Fu Tai Hua Industry (Shenzhen) Co., Ltd., Shenzhen (CN); Hon Hai Precision Industry Co., Ltd., New Taipei (TW)

(72) Inventor: Chang-Xue He, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/961,679

(22) Filed: Aug. 7, 2013

(65) Prior Publication Data

US 2014/0054913 A1    Feb. 27, 2014

(30) Foreign Application Priority Data

Aug. 24, 2012  (CN) .......................... 2012 1 03037723

(51) Int. Cl.
    *B25J 15/02*    (2006.01)
(52) U.S. Cl.
    USPC ............................ 294/207; 294/192; 294/195

(58) Field of Classification Search
    USPC ......... 294/192, 195, 119.1, 207, 213; 901/37; 269/25, 33
    See application file for complete search history.

(56) References Cited

U.S. PATENT DOCUMENTS

| 5,529,359 | A  | * | 6/1996  | Borcea et al. | 294/207 |
| 5,620,223 | A  | * | 4/1997  | Mills | 294/207 |
| 6,309,003 | B1 | * | 10/2001 | Bertini | 294/119.1 |
| 6,598,918 | B1 | * | 7/2003  | Null et al. | 294/207 |
| 7,748,761 | B2 | * | 7/2010  | Simons | 294/207 |

* cited by examiner

*Primary Examiner* — Stephen Vu
(74) *Attorney, Agent, or Firm* — Novak Druce Connolly Bove + Quigg LLP

(57) ABSTRACT

A clamping mechanism includes a mounting member, three sealing assemblies, three clamping assemblies, and six adjusting valves. The mounting member defines a receiving hole axially and three mounting holes radially, the three mounting holes communicate with the receiving hole. Each sealing assembly includes a top seal and a bottom seal sealing opposite ends of corresponding mounting hole. Each clamping assembly includes a holding member and a piston, a first end of the holding member extends through the axial hole and is received in the receiving hole, the piston is fixed to the holding member and divides the mounting hole into a first chamber and a second chamber. The six adjusting valves respectively communicate with the first chambers and the second chambers of the three mounting holes.

14 Claims, 4 Drawing Sheets

US 8,740,273 B2

CLAMPING MECHANISM

BACKGROUND

1. Technical Field

The present disclosure relates to clamping mechanisms, and more particularly to a clamping mechanism attached to a robot arm.

2. Description of Related Art

In industry, a clamping mechanism assembled to an output end of a robot arm is employed to clamp a workpiece for moving or handling the workpiece. The typical clamping mechanism includes a mounting bracket, a pair of holding members and a pair of driving members respectively connected to the pair of holding members. The pair of holding members is assembled to opposite ends of the mounting bracket, the pair of driving members is capable of driving the pair of holding members to move toward each other to clamp the workpiece between the pair of holding members. However, in order to clamp the workpiece satiability, the pair of holding members may have an outline greater than the workpiece, resulting in a relative large volume for the clamping mechanism. Furthermore, adopting of two driving members results in a complicate structure of the clamping mechanism.

Therefore, there is room for improvement in the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
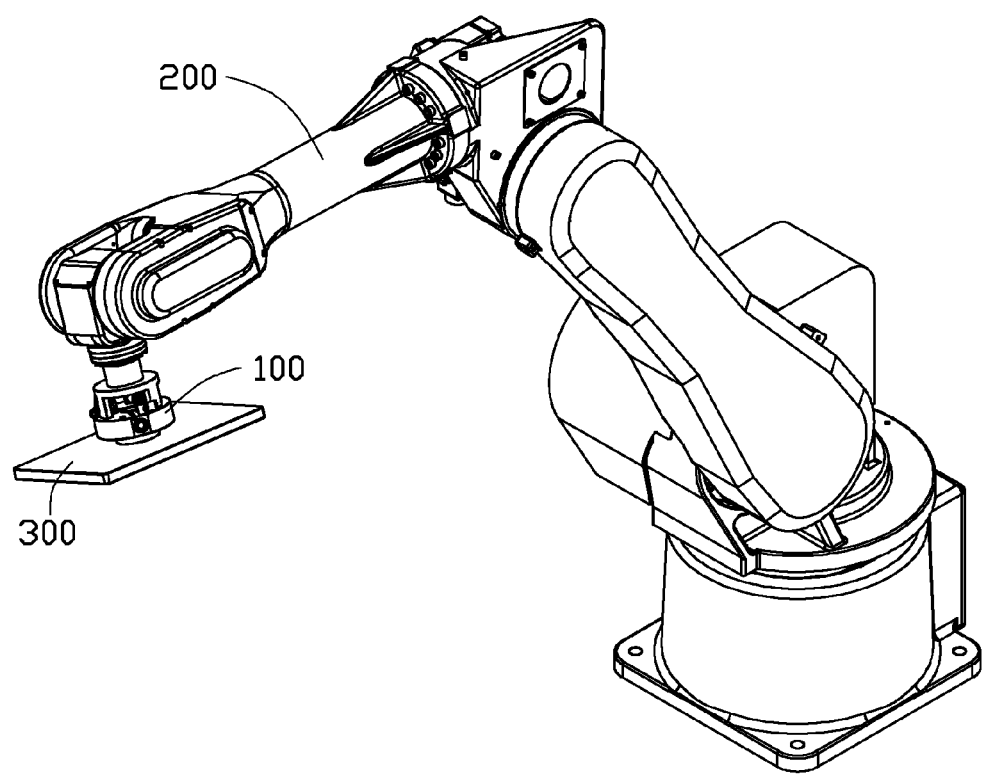
FIG. 1 is an isometric view of an embodiment of a clamping mechanism used with a robot arm.
Figure 2:
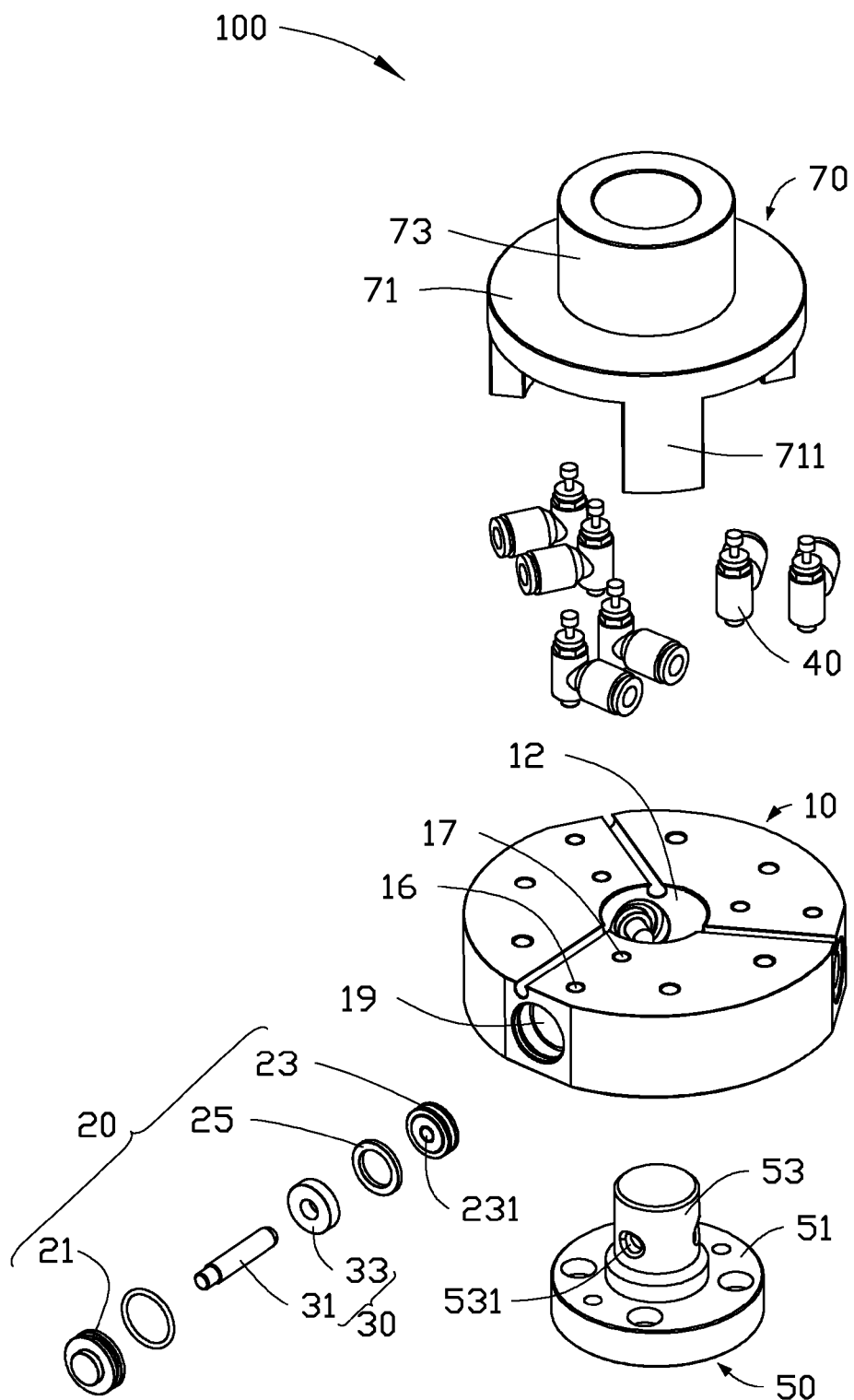
FIG. 2 is an exploded, isometric view of the clamping mechanism of FIG. 1.

FIGS. 1 and 2 show an embodiment of clamping mechanism 100. The clamping mechanism 100 is assembled to a robot arm 200 for clamping a workpiece 300. The clamping mechanism 100 includes a mounting member 10, three sealing members 20, three clamping assemblies 30, six adjusting valves 40, a connecting member 50, and a flange 70.

Figure 3:
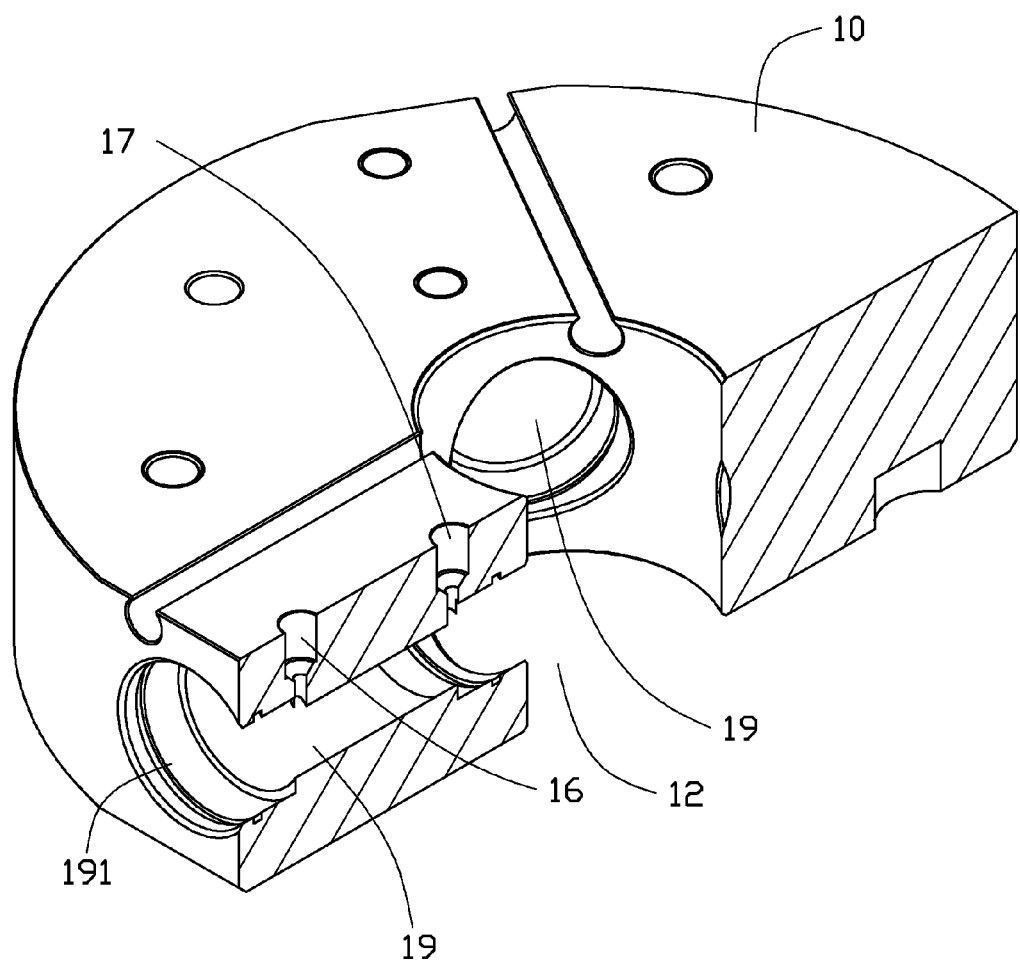
FIG. 3 is a cross-sectional view of a mounting member of the clamping mechanism of FIG. 1.

FIG. 3 shows that the mounting member 10 is substantially cylindrical, and defines a receiving hole 12 axially at a center, three inlets 16 and three outlets 17. The receiving hole 12 extends through a top and a bottom of the mounting member 10. The three inlets 16 and the three outlets 17 compose three group inlet/outlet each includes one inlet 16 and one outlet 17. Each group inlet/outlet communicates with outside air source via two adjusting valves 40. The mounting member 10 further defines three mounting holes 19 radially. The three mounting holes 19 are defined in a circumferential wall of the mounting member 10 and arranged uniformly along the circumferential wall of the mounting member 10. Each mounting holes 19 communicates with one inlet 16 and one outlet 17 subjected to the same group inlet/outlet. The three mounting holes 19 communicate with outside and the receiving holes 12 along a radial direction. Each mounting hole 19 includes a pair of annular latching grooves 191 at two opposite ends of the mounting hole 19. The latching groove 191 is recessed from a periphery of the end of the mounting holes 19.

Figure 4:
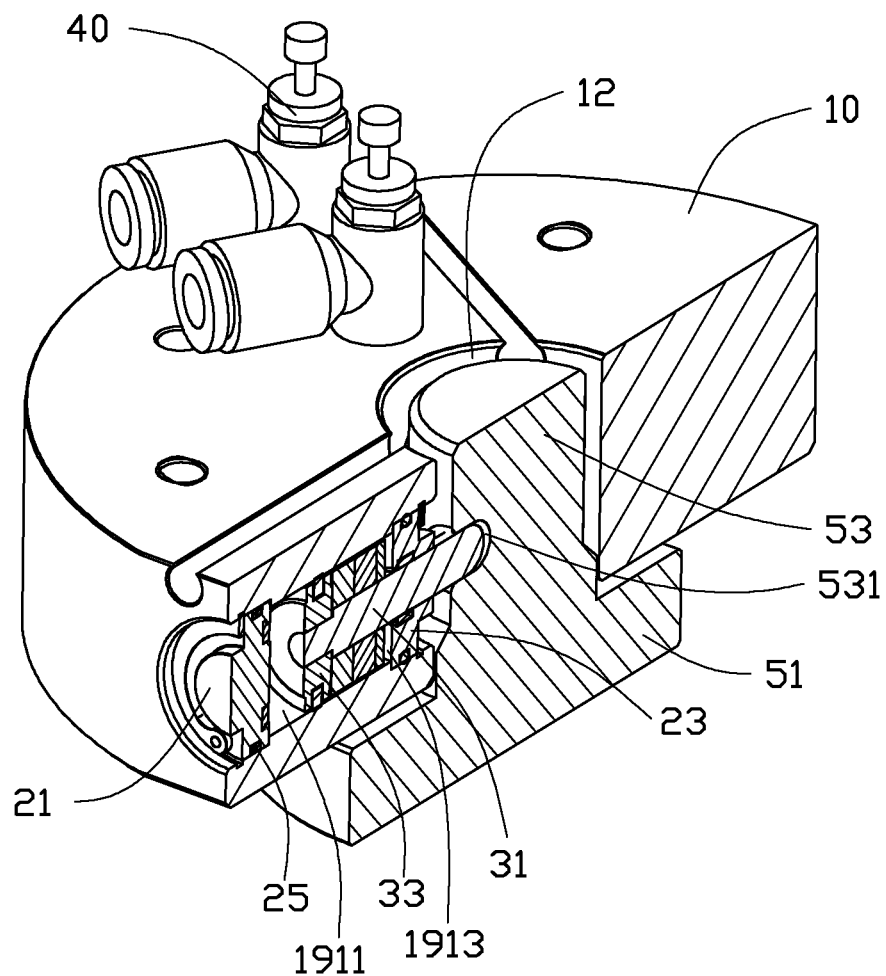
FIG. 4 is a cross-sectional view of the clamping mechanism of FIG. 1.

FIG. 4 shows that the three sealing assemblies 20 are respectively assembled into the three mounting holes 19. The sealing assembly 20 includes a bottom seal 21, a top seal 23, and a pair of sealing washers 25. The bottom seal 21 and the top seal 23 are received the latching grooves 191 via the pair of sealing washers 25 to seal opposite ends of one mounting holes 19. The top seal 23 is adjacent to the receiving hole 12, the bottom seal 21 is away from the receiving hole 12. Each sealing washer 25 is deformable and is received between the top seal 21/the bottom seal 23 and an inner side of the latching grooves 191. The top seal 23 is hollow and in a stepped shaft shape. The top seal 23 defines an axial hole 231 in a center axially. The axial hole 231 communicates with the receiving hole 12 and the mounting hole 19.

The three clamping assemblies 30 are respectively assembled into the three mounting holes 19. The clamping assembly 30 includes a holding member 31 and a piston 33. The holding member 31 is in a shaft shape, and slidably received in the mounting hole 19. A first end of the holding member 31 extends though the axial hole 231 of the top seal 231 and is received in the receiving hole 12, thereby clamping the connecting member 50. A second end of the holding member 31 opposite to the first end is received in the mounting hole 19. The piston 33 is slidably received in the mounting hole 19 and fixedly sleeved on the second end of the holding member 31. The piston 33 divides the mounting hole 19 into a first chamber 1911 and a second chamber 1913 separating from the first chamber 1911. The first chamber 1911 is formed between the bottom seal 21 and the piston 33. The second chamber 1913 is formed between the top seal 23 and the piston 33. The first chamber 1911 communicates with the inlet 16, the second chamber 1913 communicates with the outlet 17.

The six adjusting valves 40 are connected to the three inlets 16 and the three outlets 17. The six adjusting valves 40 are also connected to the outer air source, such that air is supplied to first chambers 1911, and the second chambers 1913 of the three mounting holes 19 to push the holding member 31 toward the top seals 23 or the bottom seals 21.

The connecting member 50 is fixed to the workpiece 300 and received in the receiving hole 12, and clamped by the three holding members 31. The connecting member 50 includes a connecting portion 51 and a holding portion 53 coaxial with the connecting portion 51. The connecting portion 51 has a diameter greater than that of the holding portion 53 and is fixed to the workpiece 300. The holding portion 53 defines three holding holes 531 radially along a circumferential face thereof. The three holding holes 531 are arranged along the circumferential face of the holding portion 53 uniformly and respectively receiving the three holding member 31 therein, thereby holding the connecting member 50.

The flange 70 is connected to the robot arm 200 and the mounting member 10. The flange 70 includes a fixing portion 71 and a linking portion 73 coaxial with the fixing portion 71. The fixing portion 71 has a diameter greater than that of the linking portion 73, and includes three fixing ribs 711 arranged along a side opposite to the liking portion 73. The three fixing ribs 711 are uniformly arranged adjacent to a periphery in a loop. The three fixing ribs 711 are fixed to the top of the mounting member 10, to connect the flange 70 to the mounting member 10. The linking portion 73 is connected to the robot arm 200.

When in assembly, the three pistons 33 respectively sleeve on the corresponding holding member 31 and are received in the corresponding mounting hole 19. The second ends of the three holding members 31 are exposed in the receiving holes 12. The top seal 23 and the bottom seal 21 are received in the pair of latching grooves 191. The six adjusting valves 40 are assembled to the three inlets 16 and the three outlets 17 and connect with the outer air source. The flange 70 is assembled to the robot arm 200 by the linking portion 73, and the fixing portion 71 of the flange 70 is fixed to the mounting member 10. The connecting portion 51 of the connecting member 50 is connected to the workpiece 300.

When in use, in an original state, the piston 33 is located adjacent to the bottom seal 21. First, the adjusting valves 40 allow pressured fluid such as pressured air or pressured liquid to enter into the first chambers 1911 via the inlet 16, the piston 33 is pushed toward the receiving hole 12, thereby moving the holding member 31 toward the connecting member 50. Then, the three holding member 31 engages into the three holding holes 531 of the connecting member 50 to hold the connecting member 50, therefore, the workpiece 300 is clamped. The robot arm 200 moves the flange 70 to handle the workpiece 300. When releasing the workpiece 300, the adjusting valves 40 allow pressured air to enter into the second chambers 1913, similarly, the piston 33 is pushed away from the receiving hole 12, and the resisting members 31 withdraws, therefore, the connecting member 50 is release. The inlet 16 and the outlet 17 may be exchanged.

The three clamping assembly 30 are received within the mounting member 10, thereby reducing a volume of the clamping mechanism 100, and the clamping mechanism 100 is compact. The three resisting members 31 are drives by air, such that a driver is omitted.

The number of the mounting holes 19 may be two or more than three arranged along a periphery of the mounting member 10. According, the number of the sealing assemblies 20, the clamping assemblies 30, and the adjusting vales 40 may be changed correspondingly. When the mounting member 10 is directly fixed to the robot arm 10, the flange 70 may be omitted. When the first end of the holding member 31 is a disc shape and resists a periphery of the mounting hole 191 hermetically, the piston 33 may be omitted. When the workpiece 300 has a shape corresponding the receiving hole 12, the three holding members 31 directly resist the workpiece 300, the connecting member 50 may be omitted. The top seal 23 may be integrally formed on the mounting member 10. When the axial hole 231 is defined in the mounting member 10 and the mounting hole 19 communicates with the receiving hole 12 via the axial hole 12, the top seal 23 may be omitted, and one sealing assembly 20 may be omitted.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A clamping mechanism, comprising:
a mounting member defining a receiving hole axially and at least two mounting holes radially, the at least two mounting holes communicating with the receiving hole;
at least two sealing assemblies each comprising a top seal and a bottom seal sealing opposite ends of a corresponding mounting hole, the top seal being adjacent to the receiving hole and defining an axial hole thereon;
at least two clamping assemblies slidably received in the at least two mounting holes respectively, each clamping assembly comprising a holding member and a piston, a first end of the holding member extending through the axial hole of the top seal and received in the receiving hole, a second end of the holding member being received in the mounting hole, the piston being fixed to the second end of the holding member and dividing the mounting hole into a first chamber and a second chamber separating from the first chamber;
a plurality of adjusting valves respectively communicating with the first chambers and the second chambers of the at least two mounting holes; and
a connecting member received in the receiving hole, wherein the connecting member comprises a connecting portion and a holding portion coaxial with the connecting portion, the connecting portion protrudes out of the mounting member, the holding portion is received in the receiving hole and radially defines at least two holding holes along a circumferential face, and the second end of each holding member is received corresponding holding holes, thereby holding the connecting member.

2. The clamping mechanism of claim 1, wherein each mounting hole comprises a pair of latching grooves at opposite ends, the latching groove is recessed from a periphery of the end of the mounting holes, the top seal and the bottom seal are received in the pair of latching grooves.

3. The clamping mechanism of claim 2, wherein the receiving hole is defined at a center of the mounting member and extends through a top and a bottom of the mounting member, the mounting hole communicates outside and the receiving hole, and is sealed by the top seal and the bottom seal.

4. The clamping mechanism of claim 3, wherein the sealing assembly further comprises a pair of sealing washers, one sealing washer is deformable received between the top seal and the inner side of the latching groove, the other one sealing washer is deformable received between the bottom seal and the inner side of the latching groove.

5. The clamping mechanism of claim 1, further comprising a flange comprising a fixing portion and a linking portion coaxial with the fixing portion, wherein the fixing portion comprises a plurality of fixing ribs arranged an a side thereof opposite to the liking portion, the plurality of fixing ribs are uniformly arranged adjacent to a periphery thereof in a loop and fixed to a top of the mounting member, so as to connect the flange to the mounting member, the linking portion is connected to robot arm.

6. The clamping mechanism of claim 1, wherein the at least two mounting holes comprises three mounting holes defined at a circumferential wall of the mounting member and arranged along the circumferential wall of the mounting member uniformly.

7. The clamping mechanism of claim 1, wherein the mounting member further defines at least two inlets respectively communicating with the at least two mounting holes and at least two outlets respectively communicating with the at least two mounting holes, the adjusting valves respectively communicating with the first chambers and the second chambers of the at least two mounting holes via the at least two inlets and the at least two outlets.

8. A clamping mechanism, comprising:
a mounting member defining a receiving hole axially, at least two mounting holes radially and at least two axial holes respectively communicating the at least two mounting holes with the receiving hole;
at least two sealing assemblies each comprising a bottom seal sealing an end of corresponding mounting hole away from the receiving hole;
at least two clamping assemblies slidably received in the at least two mounting holes respectively, each clamping assembly comprising a holding member and a piston, a first end of the holding member extending through the axial hole and received in the receiving hole, a second end of the holding member being received in the mounting hole, the piston being fixed to the second end of the holding member and dividing the mounting hole into a first chamber and a second chamber separating from the first chamber;

a plurality of adjusting valves respectively communicating with the first chambers and the second chambers of the at least two mounting holes; and a connecting member received in the receiving hole, wherein the connecting member comprises a connecting portion and a holding portion coaxial with the connecting portion, the connecting portion protrudes out of the mounting member, the holding portion is received in the receiving hole and radially defines at least two holding holes along a circumferential ace, and the second end of each holding member is received corresponding holding holes, thereby holding the connecting member.

9. The clamping mechanism of claim 8, wherein each mounting hole comprises a latching groove at the end away from the receiving hole, the latching groove is recessed from a periphery of the end of the mounting hole, the bottom seal is received in the latching groove.

10. The clamping mechanism of claim 9, wherein the receiving hole is defined at a center of the mounting member and extends through a top and a bottom of the mounting member, the mounting hole communicates outside, and is sealed by the bottom seal.

11. The clamping mechanism of claim 10, wherein the sealing assembly further comprises a sealing washer deformable received between the bottom seal and the inner side of the latching groove.

12. The clamping mechanism of claim 8, further comprising a flange comprising a fixing portion and a linking portion coaxial with the fixing portion, wherein the fixing portion comprises a plurality of fixing ribs arranged an a side thereof opposite to the liking portion, the plurality of fixing ribs are uniformly arranged adjacent to a periphery thereof in a loop and fixed to a top of the mounting member, so as to connect the flange to the mounting member, and the linking portion is connected to robot arm.

13. The clamping mechanism of claim 8, wherein the at least two mounting holes comprises a plurality of mounting holes defined at a circumferential wall of the mounting member and arranged along the periphery of the mounting member uniformly.

14. The clamping mechanism of claim 8, wherein the mounting member further defines at least two inlets respectively communicating with the at least two mounting holes and at least two outlets respectively communicating with the at least two mounting holes, the adjusting valves respectively communicate with the first chambers and the second chambers of the at least two mounting holes via the at least two inlets and the at least two outlets.

* * * * *